United States Patent
Mualla (10) Patent No.: US 8,622,373 B2
(45) Date of Patent: Jan. 7, 2014

(54) BEARING FOR STRUCTURES

(75) Inventor: Imad Mualla, Frederiksberg (DK)

(73) Assignee: Damptech A/S, Lyngby (DK)

( * ) Notice: Subject to any disclaimer, the term of this patent is extended or adjusted under 35 U.S.C. 154(b) by 234 days.

(21) Appl. No.: 12/922,685

(22) PCT Filed: Mar. 13, 2009

(86) PCT No.: PCT/DK2009/050059
§ 371 (c)(1),
(2), (4) Date: Dec. 3, 2010

(87) PCT Pub. No.: WO2009/112039
PCT Pub. Date: Sep. 17, 2009

(65) Prior Publication Data
US 2011/0101580 A1 May 5, 2011

(30) Foreign Application Priority Data
Mar. 14, 2008 (DK) .................................. 2008 00399

(51) Int. Cl.
*F16F 3/08* (2006.01)
*F16F 1/40* (2006.01)

(52) U.S. Cl.
USPC ....... 267/134; 267/140.11; 267/141; 188/381

(58) Field of Classification Search
USPC .............. 267/134, 136, 140.11, 140.3, 140.4, 267/141; 248/562, 564, 565, 567, 580, 584, 248/591; 52/167.7, 167.8; 188/268, 381
See application file for complete search history.

(56) References Cited

U.S. PATENT DOCUMENTS

| | | | | |
|---|---|---|---|---|
| 4,480,731 A * | 11/1984 | Izeki et al. | ..................... | 188/381 |
| 4,545,466 A * | 10/1985 | Izeki et al. | ..................... | 188/268 |
| 5,806,250 A * | 9/1998 | Medeot et al. | ............... | 52/167.8 |
| 5,862,638 A * | 1/1999 | Holland et al. | .............. | 52/167.8 |
| 6,840,016 B1* | 1/2005 | Mualla | ......................... | 52/167.8 |
| 2004/0128921 A1* | 7/2004 | Mualla | ......................... | 52/167.1 |
| 2005/0000441 A1 | 1/2005 | Kaeppeler et al. | | |

FOREIGN PATENT DOCUMENTS

| DE | 10153464 A1 | 5/2003 |
|---|---|---|
| WO | WO-01/09466 A1 | 2/2001 |
| WO | WO-02090681 A1 | 11/2002 |

\* cited by examiner

*Primary Examiner* — Thomas J Williams
(74) *Attorney, Agent, or Firm* — Birch, Stewart, Kolasch & Birch, LLP (57) ABSTRACT

A bearing (1) comprising a block (10) of flexible material, having two end surfaces (11, 12); and a first fixture element (20) and a second fixture element (30) connected at each of the end surfaces (11, 12); wherein at least one rotational damping device (40) is arranged between the first and second fixture elements (20, 30), the bearing thus providing high dampening between structural parts of a structure, such as buildings, bridges, elevated highways, and mechanical systems (machinery).

6 Claims, 8 Drawing Sheets

Application is the National Phase Under 35 U.S.C. §371 of PCT International Application No. PCT/DK2009/050059 which has an International filing date of Mar. 13, 2009, which claims priority to the Denmark Patent Application No. PA 2008 00399 filed on Mar. 14, 2008. The entire contents of all applications listed above are hereby incorporated by reference.

BEARING FOR STRUCTURES

This

FIELD OF THE INVENTION

The present invention relates to a bearing for structures of the type including a block of flexible material, such as rubber, to be arranged between structural elements of the structure.

BACKGROUND OF THE INVENTION

In order to allow relative movement of structural parts of a structure, such as buildings, bridges, elevated highways, and mechanical systems (machinery), bearings, such as block rubber bearings, are used. The movement between the parts must be allowed, in order to prevent damages, since some or all the structural parts may themselves be influenced by, e.g. their use (e.g. mechanically induced oscillations), seismic activity or wind. An example of such bearings may be cylindrical blocks of rubber used to allow horizontal movement between the pillars of a bridge and the parts making up the deck of the bridge. Especially the deck is influenced by wind and oscillations created by vehicles moving on the deck, and must be allowed controlled movement with respect to the pillars. Such bearings typically comprise an e.g. cylindrical rubber block being fixedly connected at each end surface of the cylindrical block to a structural part of the structure. The rubber block may to a limited extend be compressed in the vertical direction allowing vertical movement, and it may bend with respect to a vertical axis—through the end surfaces of the block- or twist/rotate about this vertical axis thus allowing movement in a horizontal plane. Such bearings are adequate for allowing smaller oscillations from the intended use. However in order to make such bearings being able to cope with vibration or oscillations of higher amplitude, attempts has been made to reinforce the standard rubber bearing. Some bearings of this type may therefore further comprise a metal core, e.g. a lead core, or a steel spring embedded in the rubber block in order to reinforce the bearing and to ensure that the bearing and thereby the structural parts are forced back to their original position after the movement. Also known in the art, are bearings having horizontally oriented, parallel steel plates embedded in the rubber block. However, such bearings are poor in damping movements. In order to overcome this problem, rubber bearings having a set of steel braces formed between fixture plates arranged at opposing end surfaces of the rubber block, are known. These, to a certain degree provide damping of the systems in which they are positioned, but are highly inflexible. Examples of such rubber bearings are shown in FIG. 1. Experience has shown that e.g. the above mentioned lead enforced bearings are not very durable, and that they will wear or break down after only tens of "larger" amplitude vibrations/oscillations. Since, such bearings are usually situated in structures for many years this is disadvantageous, since they may thus cause costly and technically cumbersome replacements.

Hence, an improved bearing providing damping of the movement between structural parts of structures, such as buildings, bridges, elevated highways, and mechanical systems (machinery), while also allowing flexible movement between the structural parts would be advantageous, and in particular a more efficient and/or reliable bearing would be advantageous.

OBJECT OF THE INVENTION

It is an object of the invention to provide a bearing that will provide efficient dampening of movement between structural or non structural elements or parts of structures, such as buildings, bridges, elevated highways, and mechanical systems (e.g. machinery).

It is another object of the invention to provide a bearing providing dampening and allowing flexible movement between the structural or on structural elements or parts, between which the bearing may be mounted.

It is yet another object of the invention to provide a bearing providing dampening and allowing flexible movement between the structural or on structural elements or parts, between which the bearing may be mounted.

In particular, it may be seen as an object of the present invention to provide a bearing that solves the above mentioned problems of the prior art.

It may further be seen as an object of the present invention to provide a bearing that provides an alternative to prior art bearings.

SUMMARY OF THE INVENTION

Thus, the above described object and several other objects are intended to be obtained in a first aspect of the invention by providing a bearing comprising a block of flexible material, having two end surfaces; a first fixture element and a second fixture element connected at each of the end surfaces where at least one rotational damping device is arranged between the first and second fixture elements.

The invention is particularly, but not exclusively, advantageous for obtaining damping of the movements allowed by the bearing. While providing efficient damping it can handle large lateral displacements in a plane parallel to the plane defined by a fixture element, as well as large rotations. Further, the invention is particularly, but not exclusively, advantageous for obtaining high damping of the movements allowed by the bearing. The durability of the dampening of such large movements in the new type of bearing is largely improved to hundreds or thousands of oscillations, and thus the need for replacement during the lifetime of the structure in which the bearing is placed is eliminated or greatly reduced.

In an embodiment the rotational damping device of the bearing may comprise a first arm having oppositely arranged first and second ends; and a second arm having oppositely arranged first and second ends, said first arm being rotationally connected to the first fixture element at its first end, and rotationally connected to a first end of said second arm at its second end; said second arm further being rotationally connected to said second fixture element at a second end of the second arm. Thereby, an extremely flexible bearing is obtained with respect to allowing movement between structural parts to which the bearing may be connected, and yet allowing damping of the movements, even high damping of the movements.

In one embodiment the bearing comprises a set of two rotational damping devices oppositely arranged with respect to a perimeter of the first fixture element.

In another embodiment, the bearing comprises two sets of two rotational damping devices, oppositely arranged with respect to a perimeter of the first fixture element.

In a further embodiment, one or more of the damping devices of the bearing further comprises a friction element arranged between the first and second arms.

Alternatively or in combination, one or more of the damping devices of the bearing further comprises a visco-elastic element arranged between the first and second arms.

In an embodiment, a first arm of the rotational damping device of the bearing comprises two or more parallelly arranged elongate elements. In a further embodiment a second arm of the rotational damping device of the bearing comprises two or more parallelly arranged elongate elements.

For the purpose of damping large lateral displacements and/or large rotations between the fixture elements the bearings may be designed adapted for individual projects by adapting the length and size of the lever arms, and/or the angle between the arms.

The bearing according to the various embodiments of the invention may be used between structural parts of a building, (e.g. use for base isolation, pillars and decks of bridges, elevated highways, building elements/parts, etc), between structural and non structural parts of a building (e.g. for damping movement of machinery in a production facility (factory)) and between non structural parts of a building (e.g. interconnected machines).

These and other aspects of the invention will be apparent from and elucidated with reference to the embodiments described hereinafter.

DESCRIPTION OF THE DRAWINGS

The bearing according to the invention will now be described in more detail with regard to the accompanying figures. The figures show one way of implementing the present invention and is not to be construed as being limiting to other possible embodiments falling within the scope of the attached claim set.

EMBODIMENTS OF THE INVENTION

Figure 1A:
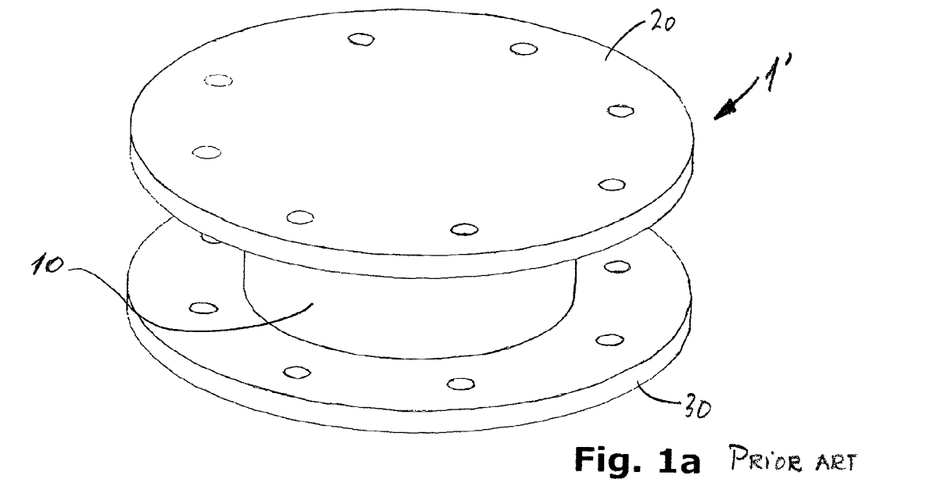
FIG. 1A-D show prior art bearings.
Figure 1B:
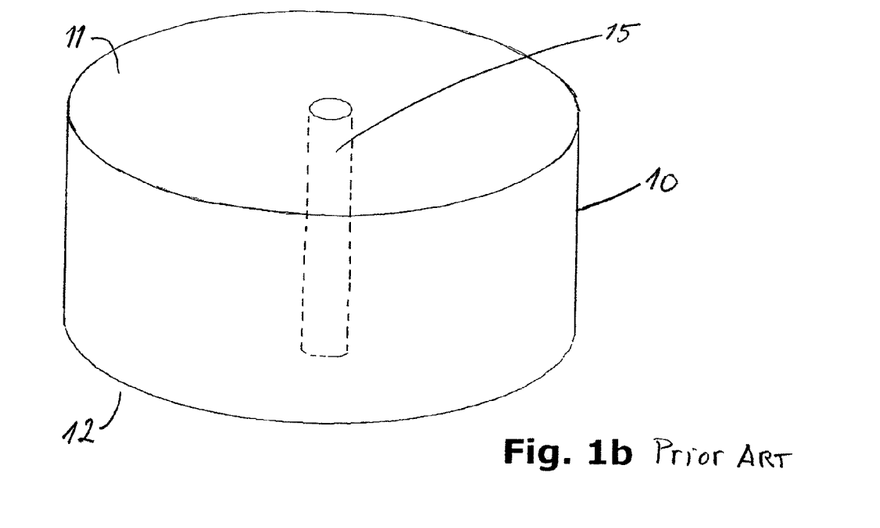
Figure 1C:
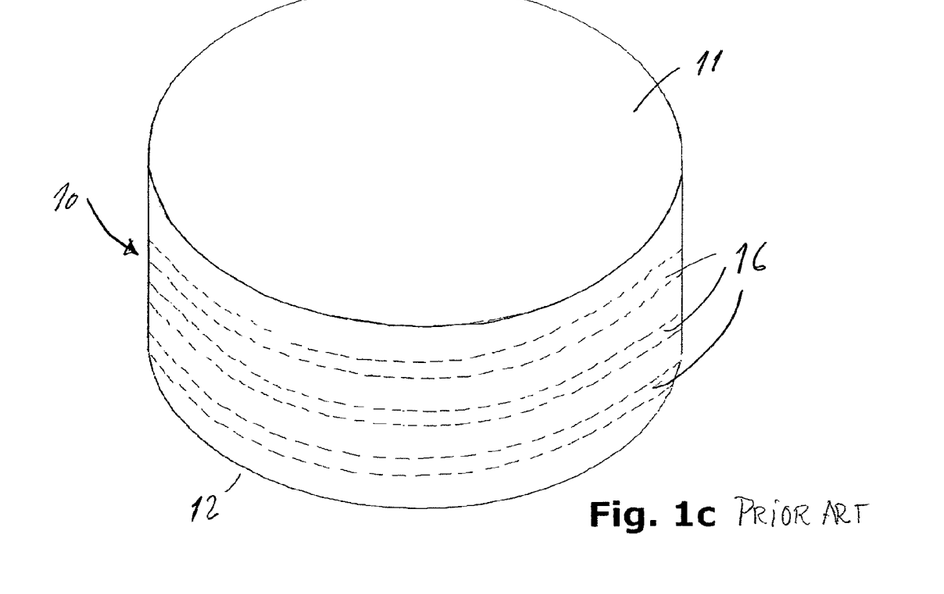

In FIG. 1A-D is shown various prior art bearings 1'. FIG. 1A shows the general principle of a prior art bearing for building structures. Such a bearing typically comprises a block of a flexible material, e.g. rubber, and a fixture element 20, 30 at each side of the block 10. The block 10 consists in general of layers of rubber and may further comprise thin layers of steel plates 16 in between as shown in FIG. 1C. In some variants, a core of e.g. lead 15 may be provided, embedded in the block 10 of rubber, as shown in FIG. 1B. Alternatively, a steel spring (not shown) or the like may be provided embedded in the rubber block.

The fixture elements 20, 30 may be steel plates, and serve for connection of the bearing to e.g. constructional elements of a building. The fixture elements 20, 30 and the block 10 are fixedly connected.

Thus, as shown in FIG. 1, the bearing comprises two steel plates one on the top and one on the bottom of the block 10.

Figure 1D:
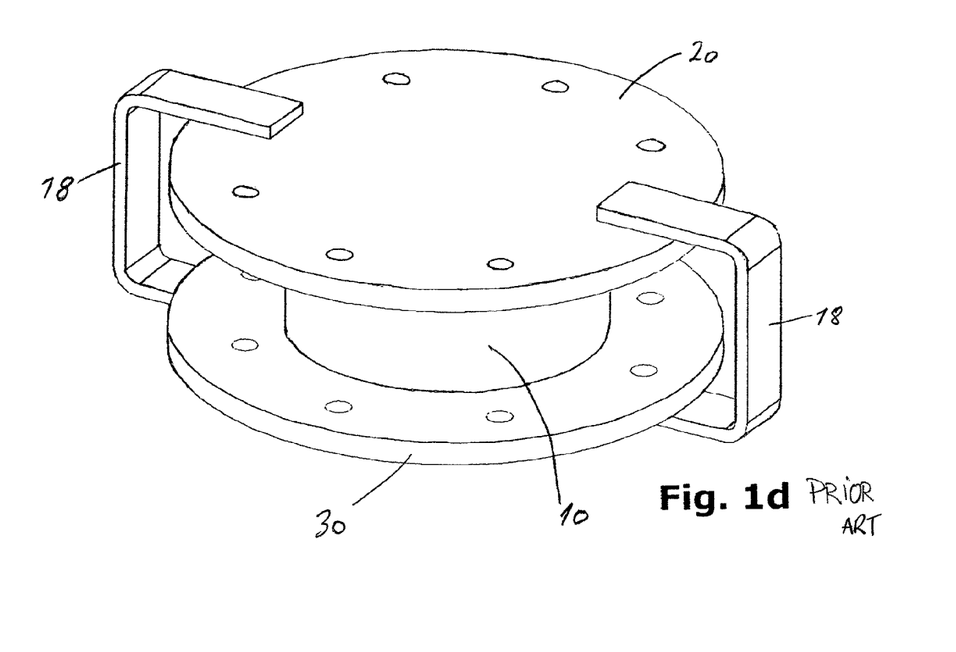

A variant, shown in FIG. 1D, have fixed connections 18 between the upper and lower fixture elements, in the form of steel braces, to ensure that the bearing returns to its original position after movement of the structural elements to which the bearing is intended to be fixed.

The fixture elements 20, 30 may be provided with fixing means for connecting the fixture elements 20, 30 to e.g. constructional elements of a building. The fixing means may be holes/apertures in the fixture elements 20, 30 as shown in FIG. 1a.

Figure 2:
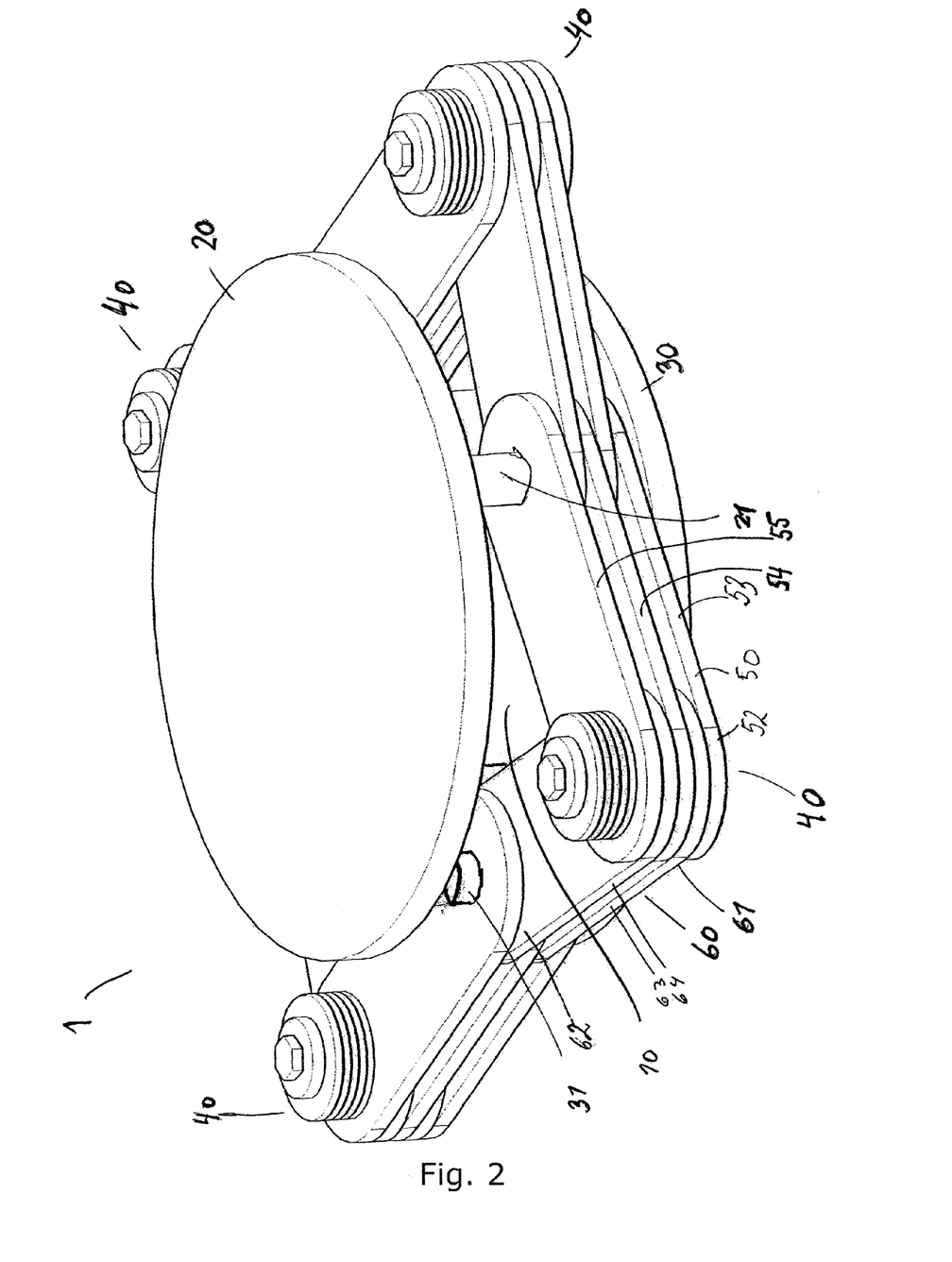
FIG. 2, in a perspective view, shows an embodiment of bearing according to the invention having four rotational dampers.
Figure 3:
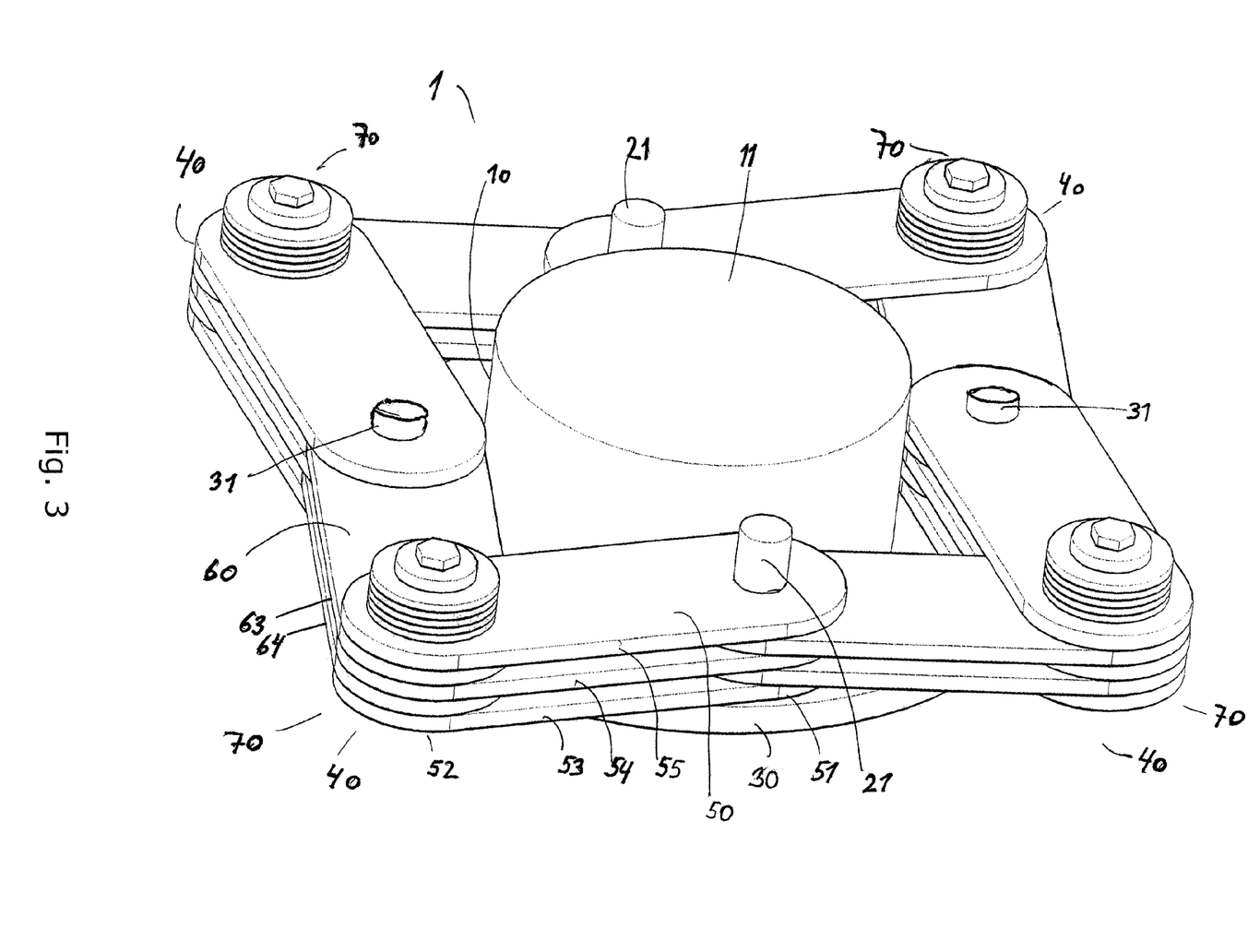
FIG. 3, in a partly cutout sectional view, shows the bearing of FIG. 2.
Figure 4:
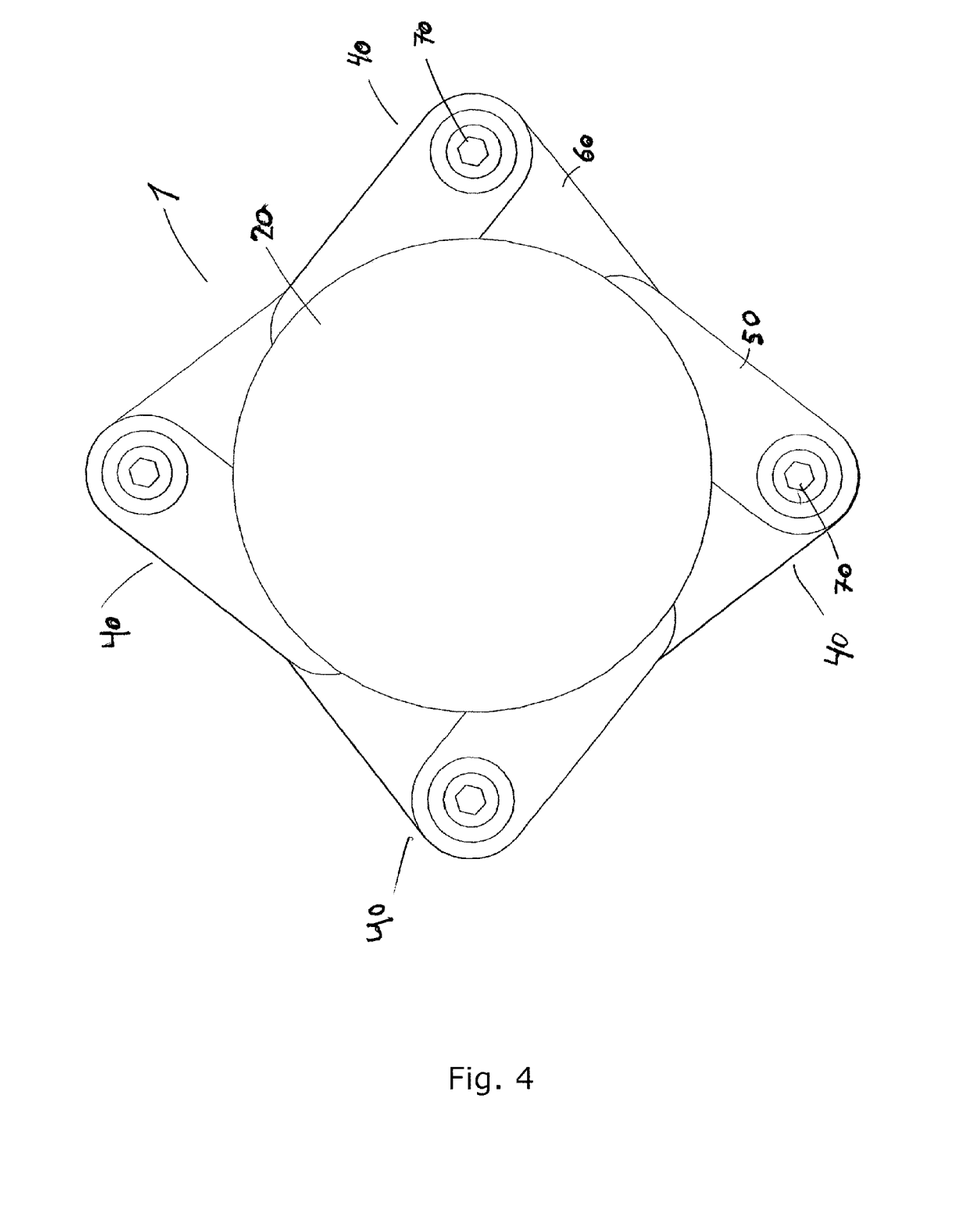
FIG. 4 shows a top view of the bearing in FIG. 2.
Figure 5:
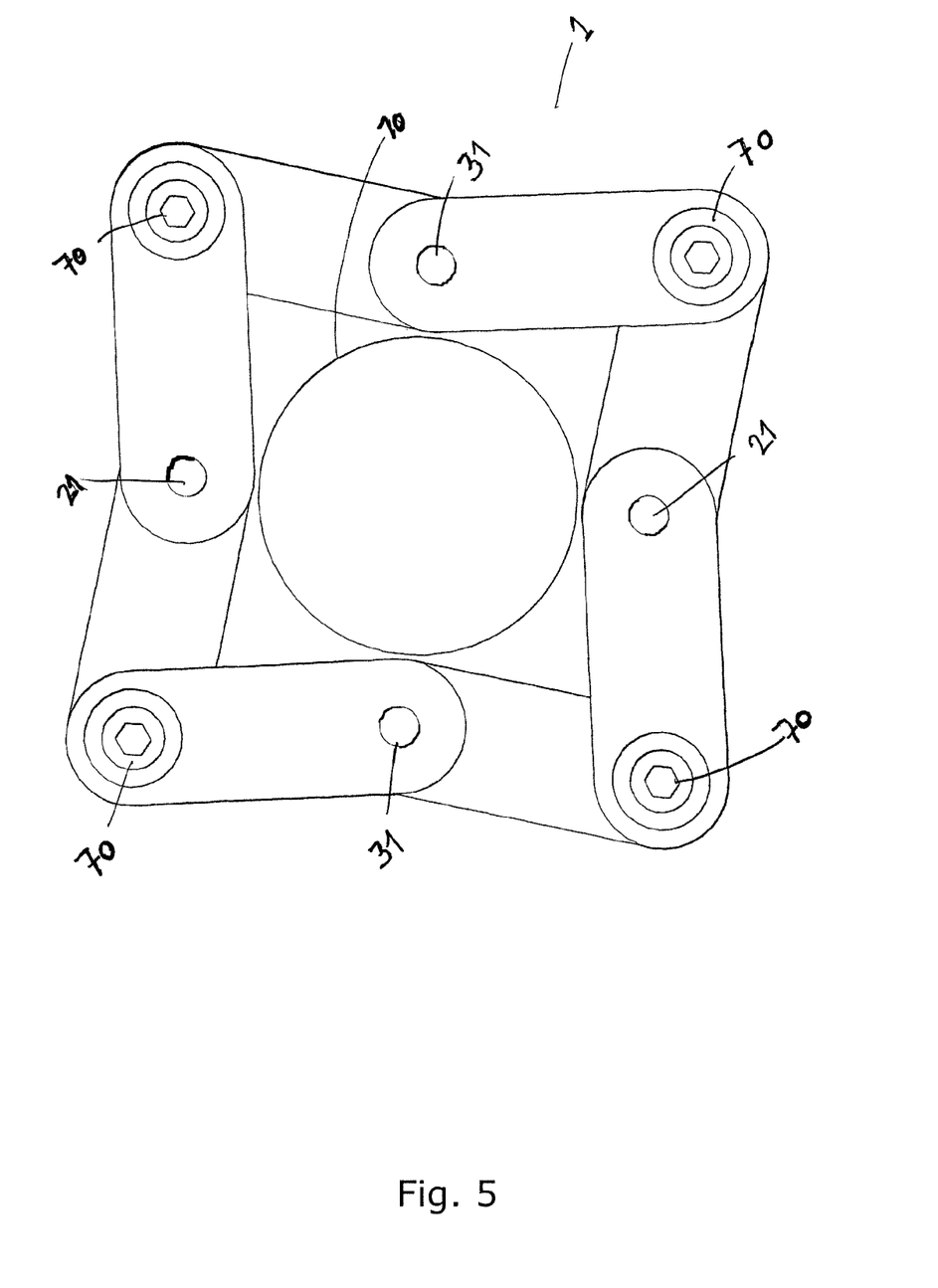
FIG. 5 shows another top view of the bearing in FIG. 2 with a fixture element removed.
Figure 6:
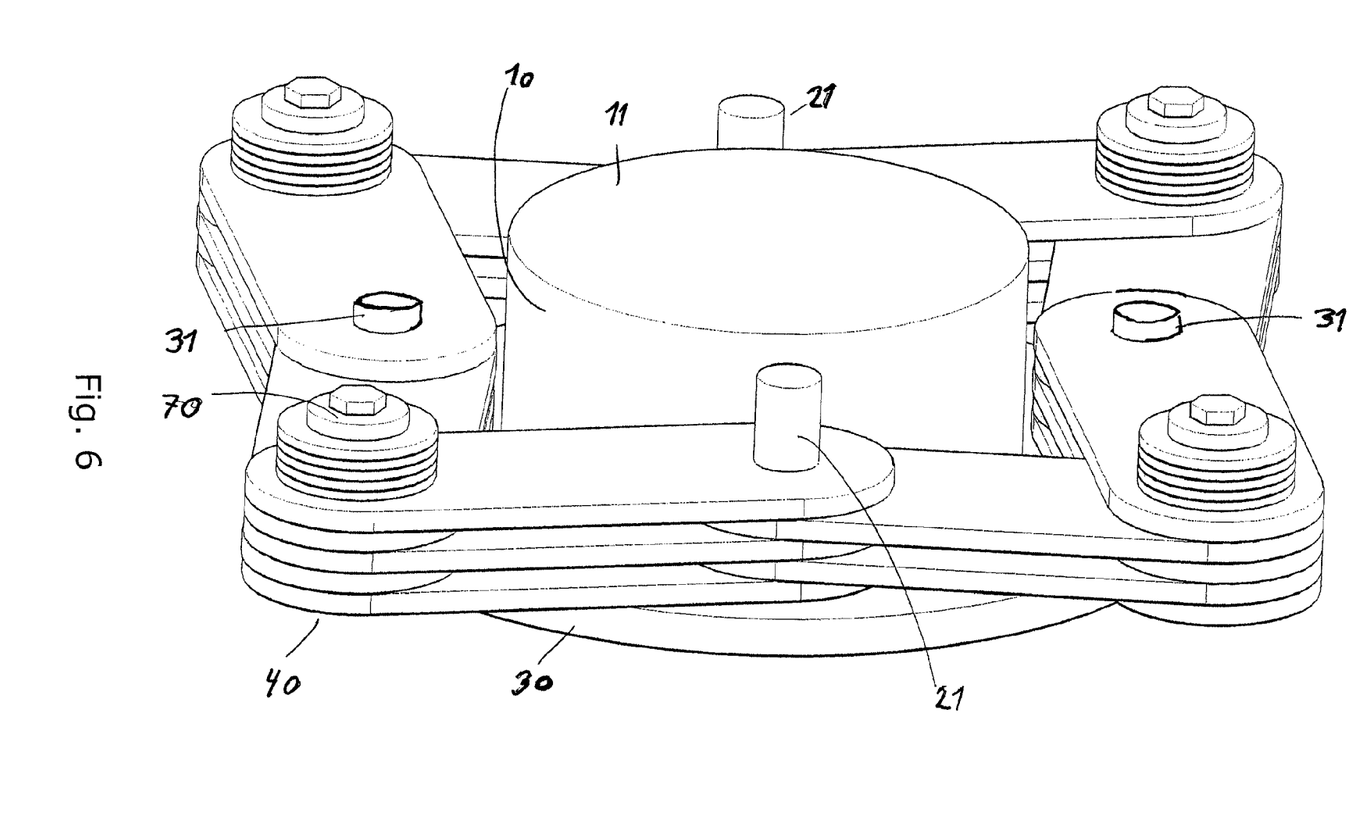
FIG. 6, in a partly cutout sectional view, shows the bearing of FIG. 3 from turned slightly.

In FIG. 2 is shown a bearing 1 according to one advantageous embodiment of the invention. The bearing 1 comprises a block 10 of a flexible material, e.g. rubber, and a fixture element 20, 30 at each side of the block 10.

The block 10 has end surfaces 11, 12, the end surfaces being connected to the fixture elements 20, 30, respectively.

The fixture elements 20, 30 may be steel plates, and serve for connection of the bearing to e.g. constructional elements of a building. The fixture elements 20, 30 and the block 10 are fixedly connected. The fixed connection may be provided by gluing the parts together, by bolting them or e.g. by corresponding pins and apertures in the parts, i.e. the block 10 and the fixture elements 20, 30. The fixture elements 20, 30 may be provided with fixing means for connecting the fixture elements 20, 30 to e.g. constructional elements of a building. The fixing means may be holes/apertures in the fixture elements 20, 30 similar to the holes shown in connection with the prior art, see FIG. 1a.

The fixture elements 20, 30 are plates. They may be circular as shown in the drawing, or they may be square, rectangular or other shapes, e.g. pentagonal, hexagonal or octagonal.

In the figures, the block 10 of flexible material is cylindrical, i.e. having a circular cross section, the cross section taken perpendicularly to an axis through the end surfaces 11, 12. In other embodiments the block 10 may have other cross sectional shapes, e.g. oval, square, pentagonal, hexagonal or octagonal.

As with the prior art, the block 10 may be formed entirely of solid mass of flexible material such as rubber, e.g. natural rubber or an artificial rubber, or it may be formed with general of layers of flexible material fixedly connected to each other. It may further comprise thin layers of steel plates 16 formed in between layers of rubber or other flexible material. Also, in some other variants, a core 15 of lead or other material may be provided, embedded in the block 10. Alternatively, a steel spring or the like may be provided embedded in the rubber block.

However, the bearing further comprises at least one rotational damping device 40 arranged between the first and second fixture elements 20, 30. In the FIG. 2-7 embodiment the bearing 1 shown, has four rotational damping devices 40 arranged in two pairs of two opposite to each other with respect to a perimeter of e.g. the first fixture element 20. However, in other embodiment there may be 1, 2, 3, 4, 5, 6, 7, 8, 9, 10, . . . , 16, or more rotational dampers 40 arranged around the perimeter of the bearing 1. Advantageously the rotational dampers 40 are arranged in opposite pairs of rotational dampers 40 viewed along the perimeter of the fixture elements 20, 30.

Each rotational damper 40 comprises a first arm 50 having oppositely arranged first and second ends 51, 52, and a second arm 60 also having oppositely arranged first and second ends 61, 62. The first arm 50 is rotationally connected to the first fixture element 20 by its first end 51. Further, the first arm 50 is, at its opposite second end 52, rotationally connected to a first end 61 of the second arm 60. The second arm 60 is, at its opposite second end 62, rotationally connected to the second fixture element 30. This may be appreciated from FIG. 7, especially.

Figure 7:
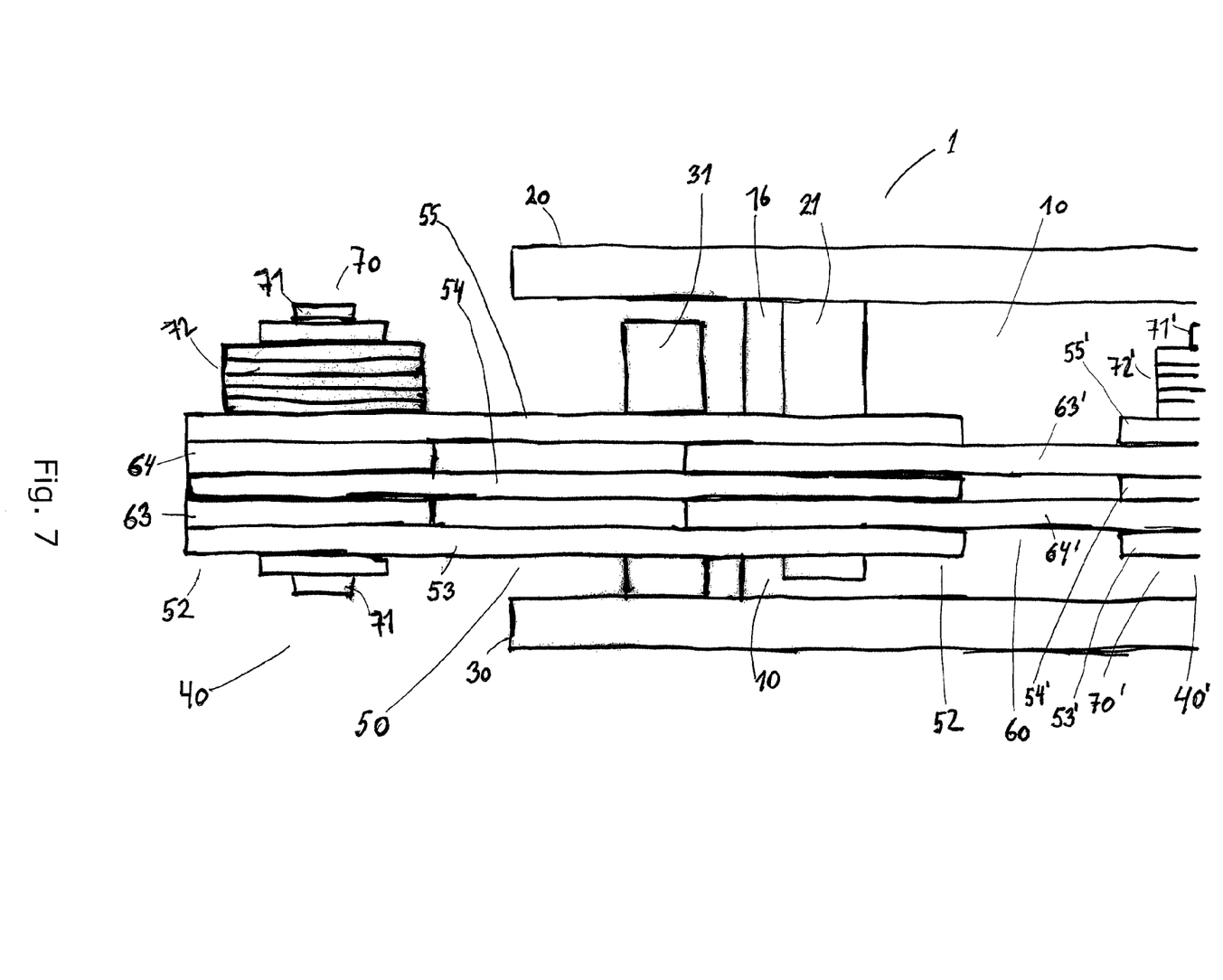
FIG. 7 is a side view of the bearing in FIG. 3, showing details of the bearing.

Each rotational damper 40 thus comprises two arms 50, 60 connected to each other via a rotational joint 70, and being arranged in a V-shape, i.e. with an angle between the arms. The rotational joint 70 may further comprise a friction material element, or pad, to increase the friction between the arms 50, 60 of the rotational dampers.

Each arm 50, 60, may be provided by a single elongate element, e.g. a steel plate. However, each arm may comprise two or more elongate elements 53, 54, 55, 63, 64. In the embodiment shown in FIGS. 2-7, the first arm 50 has three elongate elements 53, 54, 55, and the second arm has two elongate elements 63, 64. In other embodiments the respective arms 50, 60 may have one and one element, respectively; one and two elements, respectively; two and two elements, respectively; two and three elements, respectively; three and three elements, respectively; three and four elements, respectively; or four and four elements, respectively. In larger structures arms having even more elongate elements may be applied. The number of elongate elements may vary according to the dimensions of the bearing 1, in accordance with its intended use etc. In general, the number n, m of elements constituting the respective arms 50, 60 should be equal (n=m) or n=m+1 or m=n+1 if odd.

When the arms 50, 60 comprise a plurality of elongate elements 53, 54, 55, 63, 64, a piece of friction material may be arranged between each of the alternating elongate elements of the arms 50, 60, at the joint 70.

Alternatively or additionally a visco-elastic element or pad may be arranged between one or more of the alternating elongate elements of the first and second arms 50, 60 to increase the resistance to movement (damping) between the arms 50, 60 of the rotational dampers. The visco-elastic element is fixed to both of a set of adjacent elongate elements of the respective arms 50, 60 of the rotational damper 40, or in the case where each arm comprises a plurality of elongate elements, between each adjoining elongate elements of the two arms 50, 60.

The joint 70 further comprises a pin or bolt 71 and clamping means 72 for pressing the elongate elements together at the joint 70 and to increase the damping. Such clamping means may e.g. be provided by one or more springs, such as disc springs. A nut (not shown) connected to an end of the pin/bolt 71 may complete the rotational joint 70.

By this arrangement of the rotational dampers 40 around the perimeter of the fixture elements 20, 30, large lateral displacements and large rotations can be achieved by proper dimensioning of the size (length) of the lever arms 50, 60, and the angle between the arms. Experiments have shown that the angle between the arms 50, 60 should be between 60-90°. Rotational dampers having short arms 50, 60 may be used for dampening vibration or oscillation of small amplitude, in the form of displacement between the fixture element 20, 30. Rotational dampers having longer arms 50, 60 may be used for dampening vibration or oscillation of larger amplitude.

The rotational dampers 40 may be designed in different arrangements and geometries. By proper dimensioning of the block 10 and the fixture elements 20, 30 the rotational dampers 40 may be concealed within the volume defined by the fixture elements 20, 30, or they may as in the shown embodiment (FIG. 2-7) extend partly from the side (perimeter) of the bearing 1.

The elongate elements 53, 54, 55, 63, 64 of the arms 50, 60 may be formed in steel, aluminum, metal, plastic, or a composite material.

As can be appreciated from FIG. 7, each of the rotational dampers is connected to the respective fixture elements by a pin 21, 31. Each of the arms 50, 60 of a rotational damper 40 are fixed via the pins 21, 31 to a different one of the two steel plates (fixture elements 20, 30), i.e. one to the first (top) fixture element 20 and one to the second (bottom) fixture element 30, as shown in the drawing. These pins 21, 31 are providing free rotation for the arms 50, 60 of the rotational damper 40. In the figure the first arm 50 is represented by the three elongate elements 53, 54, 55. The first arm 50 is connected to pin 21 centrally in the figure. Via the joint 70, the first arm 50 is connected to the second arm of a rotational damping device 40, the second arm 60, being represented by the two elongate elements 63, and 64. In this side view the second arm 60 extends backwards with respect to the plane of the paper to the pin 31 extending from the second fixture element 30. At the right side of the figure parts of another rotational damping device 40 is partly shown, the parts of this damping device carrying the same reference numerals as for the first damping device 40, but with an apostrophe added to the reference number. Thus it may be appreciated, that the above mentioned first arm 60 extending from the central part of the figure and towards the left of the figure, in this embodiment shares the rotational join (pin 21) with a second arm 60' of the next damper 40'. However, in other embodiments each or some the rotational dampers may have individual pins to join them with their respective fixture elements.

In FIGS. 3-6 the first fixture element 20 has been omitted from the figures in order to illustrate the details of the bearing 1. From these drawings the flexibility due to the combination of the flexible material block and the rotational damping devices being alternatingly connected to the first and second fixture plate, can be envisioned.

If the bearing 1 comprises more than one rotational damper 40 different ones of the dampers may comprise friction material and visco-elastic elements. If the dampers are of a type having two or more parallely arranged elongate elements for each arm 50, 60 a combination of friction material elements and visco-elastic elements may be used between the elongate elements in one or more of the joints, rotationally connecting the arms 50, 60 of a damper 40.

In other embodiments (not shown), the bearing 1 may further comprise sliding elements arranged between some of the rotational damping devices in order to further increase the flexibility of movement between the fixation elements 20, 30.

In embodiments (not shown) a restoring element, such as a spring, may be formed on the pins 21, 31, and extending to and being fixed to the fixture element 30, 20 opposite to the pin 21, 31, respectively. Thereby, if a relative displacement of the two fixture elements cannot be restored to its original positions by the properties of the flexible block 10 material alone, the restoration may be aided by these restoring elements. Alternatively, the spring may be arranged directly between the fixture elements 20, 30.

In further embodiments (not shown), stopping elements may in addition to any one of the above described embodiments be provided between the two fixture elements 20, 30. The stopping elements, is preferably in the form of a cable of a predetermined length. The cable is fixed to inward sides of each of the fixture elements 20, 30, thereby allowing displacement of the two fixture elements relative to each other until, at a point determined by the predetermined length of the cable relative movement may be stopped. Thereby, extreme displacement may be inhibited. Alternatively, the cable may be provided between pins 21, 31 and the opposite fixture elements 30, 20 respectively.

In embodiments (not shown) the bearing 1 may in combination with any one of the above embodiments comprise two or more layers, such that an additional block 10 of flexible material is placed on e.g. the plate 20 in FIG. 2, and being connected to an additional fixture element or plate at the opposite end of the additional block, and being provided with rotational dampers between the fixture elements, as described above. Alternatively, bearings 1 as e.g. shown in FIG. 2 may be stacked fixture element to fixture element.

By an appropriate choice of dimension the bearings 1 of such a stack a bearing may be obtained to dampen oscillations of different amplitudes in a wide spectra of amplitudes.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous

The invention claimed is:

1. A bearing comprising
a block of flexible material, having two end surfaces;
at least one rotational damping device;
a first fixture element and a second fixture element connected at each of the end surfaces;
a first arm having oppositely arranged first and second ends and comprising two or more parallely arranged elongated elements; and
a second arm having oppositely arranged first and second ends, said first arm being rotationally connected to the first fixture element at the first end of the first arm, and rotationally connected to the first end of said second arm at the second end of the first arm; and said second arm further being rotationally connected to said second fixture element at the second end of the second arm
wherein said at least one rotational damping device is arranged between the first and second fixture elements and wherein said at least one rotational damping device comprises a rotational joint for damping rotational movements between the first and second fixture element in a plane parallel to said end surface.

2. A bearing according to claim 1, comprising a set of two rotational damping devices oppositely arranged with respect to a perimeter of the first fixture element.

3. A bearing according to claim 2 comprising two set of two rotational damping devices, oppositely arranged with respect to a perimeter of the first fixture element.

4. A bearing according to claim 1, wherein the damping device further comprises a friction element arranged between the first and second arms.

5. A bearing according to claim 1, wherein the damping device further comprises a visco-elastic element arranged between the first and second arms.

6. A bearing according to claim 1, wherein said second arm comprises two or more parallely arranged elongate elements.

* * * * *